United States Patent Office 3,002,075
Patented Sept. 26, 1961

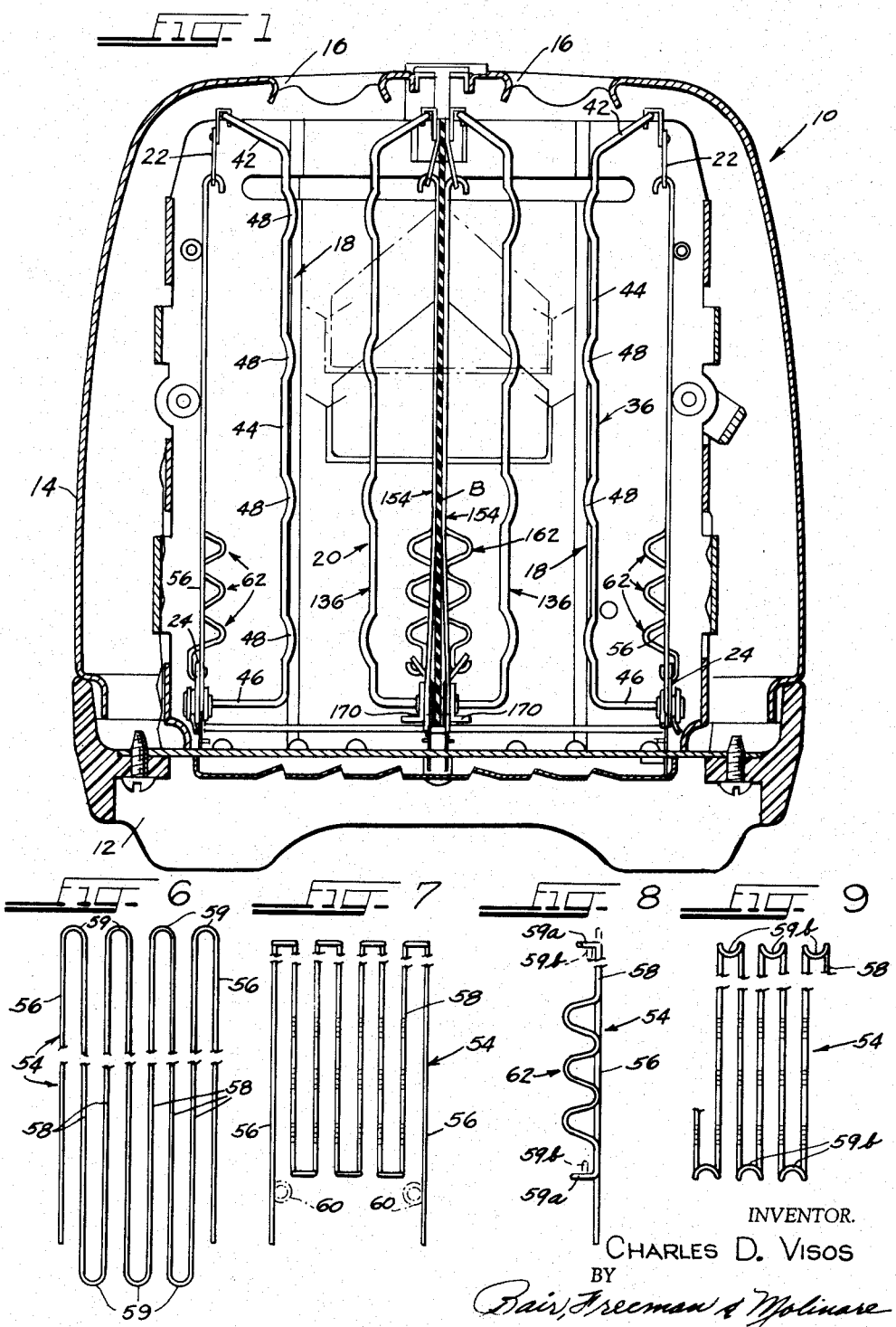

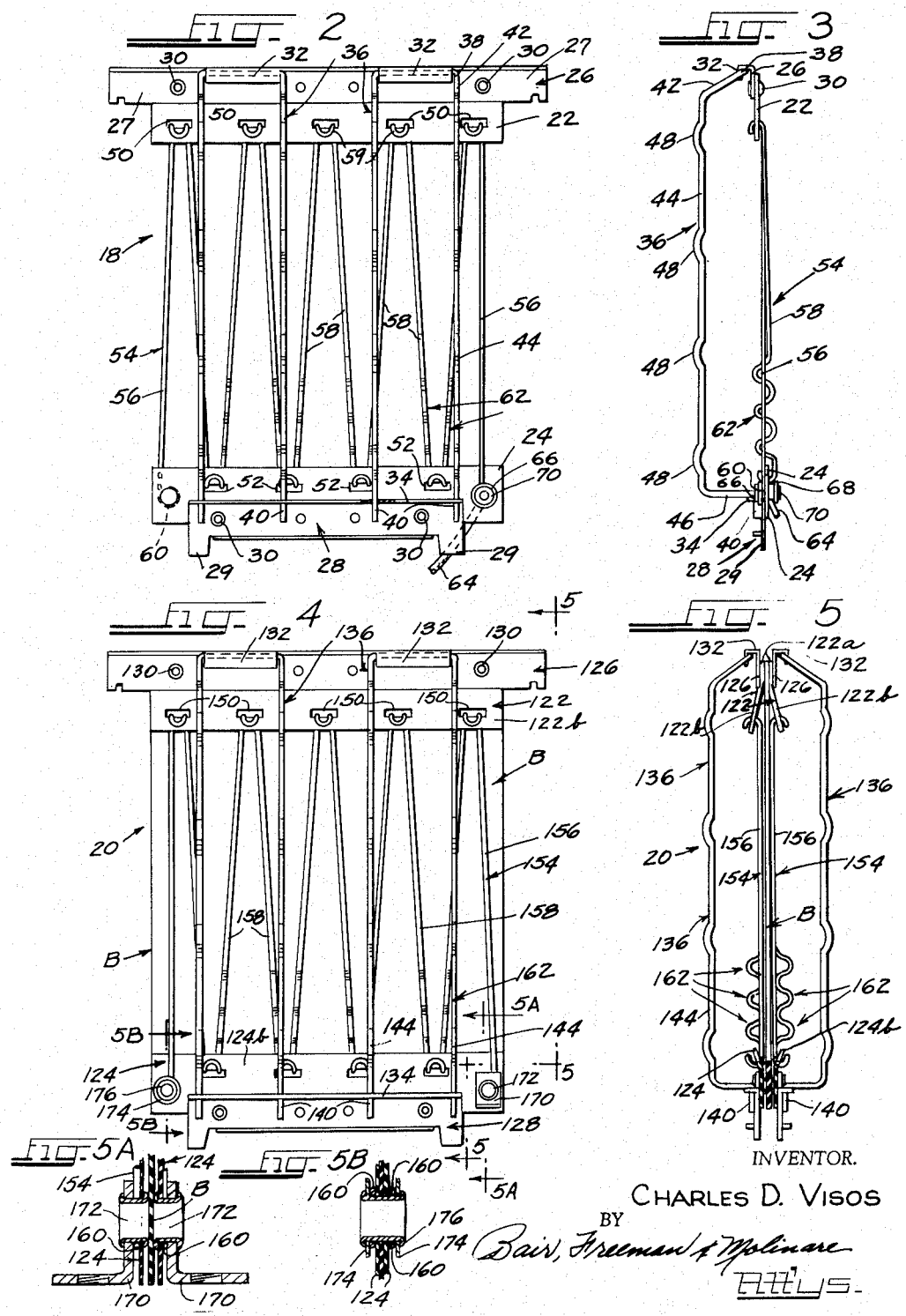

3,002,075
HEATING ELEMENT FOR TOASTER
Charles D. Visos, St. Louis, Mo., assignor to Knapp-Monarch Company, St. Louis, Mo., a corporation of Delaware
Filed Aug. 4, 1958, Ser. No. 752,783
12 Claims. (Cl. 219—19)

This invention relates to a heating unit and heating element for an electric toaster and more particularly relates to a toasting means which utilizes a heating-element preformed from a length of resilient, shape-sustaining, resistance wire.

One object of this invention is to provide a new and improved heating unit for an electric toaster, wherein is utilized a preformed heating-element of resilient, shape-sustaining, resistance wire that is resiliently distorted in one or more directions, during assembly thereof on a frame means therefor.

Another object of this invention is to provide a heating unit for toasters which utilizes a preformed heating-element of resilient, shape-sustaining, resistance wire that is provided with crimped portions in segments thereof, which crimped portions serve both as resilient expansion means which accommodate elongation of the segments of the resistance wire, and also as means for concentrating the heat output of the resistance wire at selected regions.

A further object of this invention is to provide a preformed heating-element of resilient, shape-substaining, resistance wire which is normally sinuous in form, and which is adapted to accommodate resilient distortion thereof both transversely and longitudinally of the wave shape of the heater-element.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a vertical, transverse, cross-section view through a bread toaster equipped with heating units and heater-elements constructed in accordance with this invention.

FIGURE 2 is a side elevation view of an end heating unit as used in the toaster of FIGURE 1.

FIGURE 3 is an end elevation view of the heating unit shown in FIGURE 2.

FIGURE 4 is a side elevation view of a center heating unit as used in the toaster of FIGURE 1.

FIGURE 5 is an end elevation view of the heating unit shown in FIGURE 4.

FIGURE 5A is an enlarged fragmentary detail view taken substantially on line 5A—5A of FIGURE 4.

FIGURE 5B is an enlarged fragmentary detail view taken substantially on line 5B—5B of FIGURE 4.

FIGURE 6 is a diagrammatic fragmentary view of reduced size showing in side elevation the preformed sinuous heater-element used in construction of the heating units of FIGURES 2-5, and showing the initial shape of said heater-element.

FIGURE 7 is similar to FIGURE 6 and illustrates the sinuous heater-element after the bights thereof have been bent transverse to the leg-segments prior to mounting the heater-element on a mounting frame therefor.

FIGURE 8 is a fragmentary end elevation view of the heater-element illustrated in FIGURE 7, and with the crimped portions of the resistance wire shown out of proportion for the purposes of illustration.

FIGURE 9 is similar to FIGURES 6 and 7 and illustrates the sinuous heater-element after the bights thereof have been bent over in final form as is seen in FIGURES 1-5.

Referring now to the drawings, there is shown in FIGURE 1 a vertical cross-section of a toaster that is equipped with heating units that embody the invention of this application. As shown, the toaster is generally indicated at 10 and includes an insulated base 12 of typical construction and an oven-enclosing sheet metal shell 14 carried on the base. The shell 14 is appropriately provided with one or more apertures 16 in the upper surface to receive therethrough bread slices to be toasted; and as shown in FIGURE 1, two apertures 16 are provided thereby providing a normal two-slice toaster.

A two-slice toaster is normally provided with two end heating units and a central heating unit which are spaced apart and aligned with the bread-receiving apertures in the shell so that heat emitters are provided adjacent each side of each bread slice being toasted. In the instant construction the end heating units are generally indicated at 18 and the central heating unit is generally indicated at 20. The heating units 18 and 20 are appropriately mounted within the toaster and are appropriately electrically connected in fashions which are well known in the art and which need not be described in detail herein to fully disclose the invention which is here claimed to be novel.

Each of the units 18 and the central unit 20 is preformed for convenience of assembly, and a typical end heater unit 18 is shown in FIGURES 2 and 3, while a typical central heater unit is more fully shown in FIGURES 4 and 5. Basically, each heating unit, whether it be an end unit 18 or central unit 20, includes a frame and heater-elements mounted on the frame. In the end heating unit shown in FIGURES 2 and 3, there are provided upper and lower mica insulating strips 22 and 24, and upper and lower metal strips 26 and 28. The upper metal strip 26 has laterally outwardly extending ends 27 which provide means for connection thereto, and the lower metal strip has downwardly extending tabs 29 which provide means for connecting thereto. Each pair of metal and mica strips is connected together by means of a pair of rivets 30.

The upper metal strip is shaped and formed to define a pair of downwardly opening hooks 32. The lower strip 28 is provided with a laterally outwardly extending flange 34 having a plurality of spaced apertures therethrough. Two U-shaped wire, spacer-elements generally indicated at 36 are provided, each of which serves the dual function of being guard wires and as means for maintaining the spacing between upper and lower mica strips 22 and 24. The U-shaped spacer wires 36 have the bights 38 thereof inserted through the downwardly opening hooks 32, and the extended free ends 40 of the legs of the guard wires 36 are arranged to fit through four spaced apertures in the laterally-extending flange 34 of the lower metal strip 28.

The U-shaped guard wire 36 is shaped so that, in profile, it presents an upper inclined portion 42 as best seen in FIGURES 1 and 3, an upright guard portion 44, and a lower laterally offset portion 46, a part of which abuts flange 34 of strip 28 to maintain the spacing between the upper and lower portions of the frame. The upright guard portions 44 are each provided with at least one, and preferably a plurality of, bumps 48 which are offset outwardly from the main upright guard portion 44, and said bumps 44 are designed to engage the side of a bread slice at a number of spaced points, so as to keep the bread slice centered within the toasting compartment.

The upper mica strip 22 is provided with a plurality of spaced apertures 50 arranged in lateral alignment. The lower mica strip 24 is provided with a plurality of spaced apertures 52 also arranged in lateral alignment.

The apertures 50 comprise one set of heater-element mounting means, and apertures 52 comprise a second set of heater-element mounting means. It will be seen that there is one less aperture 52 in the second set than there are apertures 50 in the first set and, further, that the set of apertures 52 are offset, and not in vertical alignment with, the apertures 50 of the first set, so that the pair of sets of apertures are adapted to receive the bights of a sinuous heater-element.

The heater-element which is adapted to be connected to the frame hereinabove described in generally indicated at 54, and certain steps in the forming of element 54 are shown in some detail in FIGURES 6-9. Initially, element 54 is in the form of a sinuated wire formed of a continuous length of resilient, shape-sustaining, resistance wire. The elongated sinuosities of the heater-element 54, shown in FIGURE 6, define two end-leg-segments 56 and a plurality of intermediate legs 58. Each of the intermediate legs 58 is connected at its ends by a bight portion 59 to an adjacent leg segment. The legs 56 and 58 are initially parallel to each other and are spaced rather closely, in an amount equal to twice the radius of curvature of the bight portions 59.

The terminus of each end-leg-segment 56 is formed with a loop 60 by means of which the heater-element 54 may be secured by a rivet, eyelet, or the like, to the mica element 24, as seen in the drawings. Before assembling the heater-element 54 upon its frame, the bight portions of the heater-element are bent laterally to provide laterally extending tongues, or tabs, as seen at 59a in FIGURE 8, and the intermediate legs 58 of the heater-element 54 are crimped, or sinuated, over a portion of the length thereof, as is indicated at 62 in FIGURE 8. Preferably, three symmetrical sinuous loops are provided in the sinuation 62, as shown.

In the initial formation of heater-element 54, the shape-sustaining resistance wire is as seen in FIGURE 6 with the sinuated intermediate legs being of greater length than end-leg-segments 56. After the intermediate legs 58 have been crimped, or sinuated, as shown at 62 and the bights 59 are bent over to the positions at 59a, the forming of the sinuations 62 operates to leave the end-leg-segments 56 with a greater length, in elevation, than the intermediate legs, as is best seen in FIGURES 7 and 8. The terminal portions of end-leg-segments 56 are of sufficient length to permit the forming thereof into loops 60 as is illustrated in dot-and-dash lines in FIGURE 7.

As an illustration of dimensions of a typical heater-element 54, the overall height of a sinuated element as seen in FIGURE 6 may be 5⅜ inches in side dimension between the tips of bights 59, the radius of curvature of bights 59 is 5/64 inch to the outside surface of the bight, between the tips of bights 59, the radius of curvature of the outside terminus of the adjacent set of bights 59. After crimping to form three (3) sinuations 62, and after forming tabs 59a, the inside height between the upper and lower sets of tabs 59a is 4 19/64 inch, the inside length of tabs 59a is 3/16 inch, the outside length over which the three (3) sinuations 62 extend is 1 1/16 inches, and the lowermost sinuation 62 has an inside spacing from the adjacent lower tab 59a of ¼ inch.

After the forming of a heater-element to the condition shown in FIGURES 7 and 8, and as described hereinabove, the heater-element 54 is then mounted on its frame, with the legs 58 of the heater 54 bridging the space between the pair of sets of mounting means 50 and 52 and by extending the laterally extending tongue portions 59a through the sets of apertures 50 and 52 in the micas 22 and 24, and then the tips of the tabs, or tongues 59a, of the heater wire 54 are reversely bent over to the positions illustrated at 59b in FIGURE 8, to thereby form hooks with the remainder of the heater-element 54, which hooks serve to securely retain the heater-element 54 upon its frame. In the final assembly as seen in FIGURES 2 and 3, the bent-over tips 59b of bights 59 do not extend beyond the edges of the mica elements 22 and 24 and are located, as shown, substantially within the lateral projections of said insulating strips 22 and 24.

It will be observed that the crimped portions 62 of the intermediate leg-segments 58 are, preferably, located closer to the lower set of apertured mounting means 52 than to the other set of apertures 50 and that said crimped portions 62 are laterally aligned so as to create a band, or area, wherein increased heat output from heater 54 is concentrated, to yield a greater per-unit-area heat output adjacent thereto. It is necessary to increase the per-unit-area heat output adjacent the lower edge of a bread slice being toasted so as to compensate for heat loss from said area due to air convection.

Furthermore, the sinuations in crimped portion 62 of leg-segments 58 are located, preferably, in planes which extend tranverse to a plane in which the remainder, or uncrimped portions, of the leg-segments 58 are located, as can be best seen in FIGURES 1, 3 and 8.

The heater-element mounting means, which comprise the sets of apertures 50 and 52 in the micas 22 and 24, are laterally spaced apart a distance greater than the original spacing between adjacent bight portions of the preformed heater-element, as seen in FIGURES 6-8, so that the legs 56 and 58 of the heater-element 54 must be laterally stretched apart to afford mounting of the heater-element 54 on its frame. The bight portions 59 accommodate such resilient lateral spreading of the heater leg-segments, so that the heater 54 is normally spread under lateral tension when the heater 54 is mounted on its mounting frame. At the same time, the crimped portions 62 of the intermediate leg-segments 58 afford resilient longitudinal elongation thereof under tension, so that the heater-element 54 is normally under laterally-spread tension and longitudinal tension after the heater-element 54 is mounted on its frame means.

A simple electrical connection may be conveniently provided for one or both ends of heater-element 54, and, as best seen in FIGURE 3, there is provided an electrical connector 64 having a looped end, a pair of metal washers 66 and 68 which respectively engage the outer side of loop 60 on leg-segment 56 and the outer side of the loop on connector 64. The said loops are clamped against opposite sides of the mica element 24 by means of the turned-over ends of an eyelet connector 70, which passes through said loops and washers and which engages the outer sides of washers 66 and 68 thereby providing a pre-assembled toaster heating unit with an electrical connector extending therefrom.

The construction of a center heating unit 20 is patterned closely after the construction of an end heating unit 18, as hereinabove described, with certain modifications. In the drawings, parts illustrated in FIGURES 4 and 5 and generally corresponding with a part shown in FIGURES 2 and 3 are identified by the part number of FIGURES 2 and 3 plus 100. Thus, the heater-elements 154 of FIGURES 4 and 5 correspond with the heater-element 54 of FIGURES 2 and 3, etc. Basically, a center unit 20 combines a pair of end units 18 assembled in back-to-back relation. More specifically, as shown in FIGURES 4 and 5, there is provided a pair of upper mica insulators 122 which are shaped to define upper parallel portions 122a and downwardly and outwardly inclined portions 122b. The outwardly inclined portions 122b have formed therein the mounting means 150 to which the upper hooked ends of the heater-elements 154 attach. Similarly, a pair of lower mica elements 124 are provided with upwardly and outwardly inclined portions 124b having formed therein the mounting means 152 to which the lower ends of the heater-elements 154 attach.

There is also provided a pair of upper metal strips 126 having hooks 132 and a pair of lower metal strips 128 having apertured flanges 134. Positioned between the pair of micas 122 and 124 and between the pair of heater-elements 154 is a planar insulating baffle B formed of a sheet of glass fiber, which baffle serves to reflect heat from each adjacent heater 154 toward the associate toaster compartments and also serves to insulate each toasting compartment from the heat generated in the other toasting compartment. Each heater-element mounting frame which includes micas 122 and 124, metal strips 126 and 128, and guard wires 136, is secured to the insulating baffle B and to the other heater-element mounting frame by means of upper and lower pairs of rivets 130.

The pair of heater-elements 154 in the center heating unit are similar to the heating-element 54 in FIGURES 2 and 3 and have sinuous sub-portions 162 wherein the sinuosities extend outwardly relative to baffle B. The heater-elements 154 are electrically connected in series by means which are shown more fully in FIGURES 5A and 5B.

In FIGURE 5A, the adjacent ends of the two heater-elements 154 are each shown in electrical connection with an angle-shaped bus bar support 170 by means of a crimped-over eyelet 172 which secures the bus bar support 170, and the looped end 160 of the heater-element 154 to its adjacent mica support 124; and the pair of eyelets 172 are insulated from each other by the glass fiber baffle B, or other appropriate insulating material, positioned therebetween. The outwardly extending flanges of the bus bar supports 170 provide means for electrical connection thereto.

The opposite ends of the heater-elements 154 are electrically connected to each other, as best seen in FIGURE 5B, by means of a pair of metal washers 174, and a single eyelet connector 176 having its ends turned over and clamping together the washers 174, the looped ends 160 of heater-elements 154, the mica units 124, and the baffle B.

It will, of course, be understood that the same shape is imparted to heater-elements 154 as is shown for heater-element 54. Therefore, and in order to compensate for the different amounts of heat required to be dissipated by the elements, since a different amount of heat is required from an outside heater-element as compared with a center heater-element, and in order to provide the necessary wattage relationship for said required heat distribution relationship on the opposite sides of a slice of bread being toasted, it is only necessary to use different wire sizes for the end heating-elements and the center heating-elements. The transverse sinuations at the lower ends of the intermediate legs of the sinuated heating-elements provide a greater concentration of the heat at the bottom of a toasting chamber so that an even toast color is imparted to the bread from the bottom to the top of the slice.

While there is disclosed the use of mica as the insulating elements upon which the heater-elements are mounted, it will be understood that ceramic or other insulators may be used.

In the complete toaster element assemblies shown in FIGURES 2 and 3, and in FIGURES 4 and 5, the transversely sinuated portions 62 in FIGURES 2 and 3, and 162 in FIGURES 4 and 5, serve to hold the legs of the heater-elements taut so as to make the wire forms 54 and 154 more durable in use. The said tension on the legs of the wire heaters reacts against, and effects compression in, the heavier guard wires 36 and 136 so that, in conjunction with the upper and lower micas and metal strips, the toaster element assemblies comprise unitary, self-contained assemblies of parts completely fastened together so that these assemblies may readily be assembled or replaced in the finished toaster. The sinuated portions 62 and 162 also serve to tension the legs of the wire heater-elements 54 and 154 even when those elements are hot and are normally subject to expansion, and this tensioning serves to prevent displacement, or distortion, of the heater-elements 54 and 154.

The baffle B between the two center heating-elements 154 of the center heating unit is preferably of fiber glass construction, although other insulating material could also be used, and said baffle permits of single-slice toasting without overheating thereof by virtue of the baffle substantially preventing the heat from one toasting chamber from entering the second toasting chamber during the toasting of a single slice of bread.

As a further advantage, the use of the identical wire forming path for both the center heating-elements and for the outside heating-elements makes possible the use of the same sinuating machine and same sinuating operation for both types of heating-elements, even though the resistance wire size and the wattage of the center elements 154 and the outside elements 54 are normally different.

It will be seen from the foregoing that the construction disclosed herein provides an efficient yet durable long-life toaster heating-element design which utilizes a minimum of materials at a reduced cost.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A heating unit for a toaster comprising, in combination: a heater-element mounting frame having a pair of spaced sets of mounting means defined thereon, each set of mounting means including a plurality of laterally spaced heater-element mounting means, the spacing between the pair of sets being much greater than the spacing between adjacent means of one set; a preformed heater-element for mounting on said frame, said heater-element being formed of a continuous length of resilient, shape-sustaining, resistance wire that is preformed in a plurality of elongated sinuosities which define a plurality of elongated heater leg-segments which are adapted to bridge the spacing between the sets of mounting means, there being two end leg-segments, and a plurality of intermediate leg-segments each of which is connected at its ends by a bight portion to an adjacent leg-segment; and the heater-element mounting means of each set of mounting means being laterally spaced apart a distance greater than the normal spacing of adjacent bight portions of the preformed heater-element, and the bight portions of the heater-element being connected to the pair of sets of mounting means on the mounting frame and also affording resilient lateral spreading of the heater leg-segments against the inherent resilience of the wire tending to restore itself to its preformed condition, so that the heater-element is normally spread under lateral tension when the heater-element is connected to said mounting frame.

2. A heating unit for a toaster comprising, in combination: a heater-element mounting frame having a pair of spaced sets of mounting means defined thereon, each set of mounting means including a plurality of laterally spaced heater-element mounting means, the spacing between the pair of sets being much greater than the spacing between adjacent means of one set; a preformed heater-element for mounting on said frame, said heater-element being formed of a continuous length of resilient, shape-sustaining, resistance wire that is preformed in a plurality of elongated sinuosities which define a plurality of elongated heater leg-segments which are adapted to bridge the spacing between the sets of mounting means, there being two end leg-segments, and a plurality of intermediate leg-segments each of which is connected at its ends by a bight portion to an adjacent leg-segment, and each intermediate leg-segment of the heater-element being crimped over only a portion of the length thereof to increase the effective heating length and the per-unit-area heat output of the heater-element adjacent the region of said crimped length; and the heater-element mounting means of each set of mounting means being laterally spaced apart a distance greater than the normal spacing of adjacent bight portions of the preformed heater-element, the bight portions of the heater-element being connected to the pair of sets of mounting means on the mounting frame and also affording resilient lateral spreading of the heater leg-segments so that the heater is normally spread under lateral tension when the heater is connected to said mounting frame, and the crimped intermediate leg-segments affording resilient, longitudinal elongation thereof under tension thereof when the heater-element is connected to said mounting frame.

3. A heating unit for a toaster comprising, in combination: a heater-element mounting frame having a pair of spaced sets of mounting means defined thereon, each set of mounting means including a plurality of laterally spaced heater-element mounting means, the spacing between the pair of sets being much greater than the spacing between adjacent means of one set; and a preformed heater-element for mounting on said frame, said heater-element being formed of a continuous length of resilient, shape-sustaining, resistance wire that is preformed in a plurality of elongated sinuosities which define a plurality of elongated heater leg-segments which are adapted to bridge the spacing between the sets of mounting means, there being two end leg-segments, and a plurality of intermediate leg-segments each of which is connected at its ends by a bight portion to an adjacent leg-segment, and each intermediate leg-segment of the heater-element being crimped over only a portion of the length thereof to increase the effective heating length and the per-unit-area heat output of the heater-element adjacent the region of said crimped length; and the heater-element mounting means of each set of mounting means being laterally spaced apart a distance greater than the normal spacing of adjacent bight portions of the heater-element, the bight portions of the heater-element being connected to the pair of sets of mounting means on the mounting frame and also affording resilient lateral spreading of the heater leg-segments so that the heater is normally spread under lateral tension when the heater-element is connected to said mounting frame, and the crimped intermediate leg-segments affording resilient, longitudinal elongation thereof under tension thereof when the heater-element is connected to said mounting frame, and said crimped portions of said intermediate leg-segments being located closer to one set of mounting means than to the other set so as to increase the total heat output of the heater-element adjacent said one set of mounting means.

4. A heating unit for a toaster as set forth in claim 1 wherein the heater-element mounting frame includes a pair of spaced insulating strips, and preformed, elongated, wire spacer-elements interconnecting said insulating strips to maintain the spacing of said strips, and each wire spacer-element being formed with at least one outwardly extending offset portion therein.

5. A heating unit for a toaster as set forth in claim 1 wherein the mounting frame includes a pair of spaced insulating strips each formed with a set of spaced openings therein serving as one of the said pair of sets of mounting means; and wherein the said bights of the heater-element are bent away from the plane through the heater's leg-segments so as to extend through the sets of apertures in said insulating strips, said bight portions which extend through the insulating strips each being bent against the insulating strips to grip the insulating strips between said bights and the adjacent leg-segments of the heater-element, and said bight portions being of such dimension that the tips of the bights are located substantially within lateral projections of the insulating strips.

6. A heating unit for a toaster as set forth in claim 2 wherein the crimping of the intermediate leg-segments of the heater-element are sinuous in form.

7. A heater-element for a toaster or the like comprising, a preformed heater-element formed of a continuous length of resilient, shape-sustaining, resistance wire that is preformed to sustain itself in a plurality of elongated sinuosities, which define a plurality of elongated heater leg-segments, there being two end leg-segments, and a plurality of intermediate leg-segments each of which is connected at its ends by a bight portion to an adjacent leg-segment, and each intermediate leg-segment of the heater-element being crimped over only a portion of the length thereof to increase the effective heating length and the per-unit-area heat output of the heater-element adjacent the region of said crimped length, the bight portions of the heater-element affording resilient lateral spreading of the heater leg-segments against the inherent resilience of the wire tending to restore itself to its preformed condition, and the crimped portions of the intermediate leg-segments affording resilient, longitudinal, elongation thereof.

8. A heater-element for a toaster or the like comprising, a preformed heater-element formed of a continuous length of resilient, shape-sustaining, resistance wire that is preformed to sustain itself in a plurality of elongated sinuosities, which define a plurality of elongated heater leg-segments, there being two end leg-segments, and a plurality of intermediate leg-segments each of which is connected at its ends by a bight portion to an adjacent leg-segment, and each intermediate leg-segment of the heater-element being crimped over only a portion of the length thereof to increase the effective heating length and the per-unit-area heat output of the heater-element adjacent the region of said crimped length, the bight portions of the heater-element affording resilient lateral spreading of the heater leg-segments against the inherent resilience of the wire tending to restore itself to its preformed condition, the crimped portions of the intermediate leg-segments affording resilient, longitudinal elongation thereof, and said crimped portions of said intermediate leg-segments being laterally aligned so as to create an area wherein increased heat output is concentrated.

9. A heater-element as set forth in claim 7 wherein the crimping of the intermediate leg-segments of the heater-element are sinuous in form.

10. A heater-element as set forth in claim 7 wherein the crimping of the intermediate leg-segments of the heater-element are sinuous in form and extend transversely to a plane in which the remainder of the heater-element leg-segments are located.

11. A center heating unit for a toaster comprising, in combination: a planar insulating baffle, a heater-element mounting frame secured to each side of said baffle, each of said mounting frames having a pair of spaced sets of mounting means defined thereon and spaced laterally of the adjacent side of said baffle; a preformed heater-element for mounting on each frame, said heater-element being formed of a continuous length of resilient, shape-sustaining, resistance wire that is preformed to sustain itself in a plurality of elongated sinuosities which define a plurality of elongated heater leg-segments which are adapted to bridge the spacing between the spaced sets of mounting means on the frame and to attach thereto, there being two end leg-segments, and a plurality of intermediate leg-segments each of which is connected at its ends by a bight portion to an adjacent leg-segment and each intermediate leg-segment being sinuated over only a portion of the length thereof to accommodate resilient longitudinal elongation thereof, and the leg-segments of each heater-element being resiliently spread laterally against the inherent resilience of the wire tending to restore itself to its preformed condition, and each intermediate leg-segment being resiliently elongated, from their normal preformed condition when the heater-element is connected to said mounting means.

12. A center heating unit for a toaster comprising, in combination: a planar insulating baffle, a heater-element mounting frame secured to each side of said baffle, each of said mounting frames having a pair of spaced sets of mounting means defined thereon and spaced laterally of the adjacent side of said baffle; a preformed heater-element for mounting on each frame, said heater-element being formed of a continuous length of resilient, shape-sustaining, resistance wire than is preformed in a plurality of elongated sinuosities which define a plurality of elongated heater leg-segments which are adapted to bridge the spacing between the spaced sets of mounting means on the frame and to attach thereto, there being two end leg-segments, and a plurality of intermediate leg-segments each of which is connected at its ends by a bight portion to an adjacent leg-segment and each intermediate leg-segment being sinuated over a portion of the length thereof to accommodate resilient longitudinal elongation thereof, and the leg-segments of each heater-element being resiliently spread laterally, and each intermediate leg-segment being resiliently elongated, from their normal preformed condition when the heater-element is connected to said mounting means, and means extending through said insulating baffle and electrically connecting one end of each heater-element to effect a series connection therebetween, and a pair of electrical conductors connected individually to the other ends of said heater-elements and insulated from each other by said insulating baffle.

References Cited in the file of this patent

UNITED STATES PATENTS

| | | |
|---|---|---|
| 1,555,542 | Young | Sept. 29, 1925 |
| 1,756,784 | Johnson | Apr. 29, 1930 |
| 2,247,869 | Beers | July 1, 1941 |
| 2,576,632 | Myers | Nov. 27, 1951 |
| 2,598,592 | Olson et al. | May 27, 1952 |
| 2,659,800 | Zander | Nov. 17, 1953 |
| 2,685,633 | Olson et al. | Aug. 3, 1954 |
| 2,747,072 | Lawser | May 22, 1956 |
| 2,778,912 | Palmer et al. | Jan. 22, 1957 |
| 2,779,849 | Gomersall | Jan. 29, 1957 |
| 2,847,931 | Saint | Aug. 19, 1958 |
| 2,849,946 | Palmer | Sept. 2, 1958 |
| 2,907,269 | Rodwick et al. | Oct. 6, 1959 |